US012583555B2

(12) United States Patent
Matsuzaki et al.

(10) Patent No.: US 12,583,555 B2
(45) Date of Patent: Mar. 24, 2026

(54) ELECTRIC BALANCE BIKE

(71) Applicant: KAWASAKI MOTORS, LTD., Akashi (JP)

(72) Inventors: Shota Matsuzaki, Akashi (JP); Masato Kogirima, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 244 days.

(21) Appl. No.: 17/896,222

(22) Filed: Aug. 26, 2022

(65) Prior Publication Data
US 2023/0062620 A1     Mar. 2, 2023

(30) Foreign Application Priority Data
Aug. 26, 2021     (JP) ................................. 2021-138116

(51) Int. Cl.
| | |
|---|---|
| B62M 6/60 | (2010.01) |
| B62J 43/13 | (2020.01) |
| B62K 3/02 | (2006.01) |
| B62M 6/90 | (2010.01) |

(52) U.S. Cl.
CPC ............... B62M 6/60 (2013.01); B62J 43/13 (2020.02); B62K 3/02 (2013.01); B62M 6/90 (2013.01)

(58) Field of Classification Search
CPC . B62M 6/90; B62M 6/40; B62M 6/60; B62M 6/65; B62J 43/13; B62J 43/16; B62J 43/28; B62K 2204/00
See application file for complete search history.

(56) References Cited

U.S. PATENT DOCUMENTS

| | | | | |
|---|---|---|---|---|
| 8,469,381 | B2 * | 6/2013 | Dodman .................. | B62M 6/55 |
| | | | | 280/281.1 |
| 8,727,367 | B2 * | 5/2014 | Talavasek .............. | B62K 19/06 |
| | | | | 280/281.1 |
| 8,979,110 | B2 * | 3/2015 | Talavasek ................ | B62M 6/60 |
| | | | | 280/279 |
| 10,170,737 | B2 * | 1/2019 | Shimoda ............. | H01M 50/202 |
| 10,730,584 | B2 * | 8/2020 | Ragland ................... | B62J 25/04 |
| 10,868,288 | B2 * | 12/2020 | Nishihara ................ | B62M 6/90 |
| 10,930,903 | B2 * | 2/2021 | Mitsuyasu ............... | B62M 6/90 |
| 11,021,212 | B2 * | 6/2021 | Shimoda .................. | B62J 43/28 |
| 11,325,678 | B2 * | 5/2022 | Wecker .................. | B62K 19/40 |

(Continued)

FOREIGN PATENT DOCUMENTS

| | | | | |
|---|---|---|---|---|
| CN | 112078719 A | * 12/2020 | .............. | B62J 43/13 |
| JP | 2016-101914 A | 6/2016 | | |

(Continued)

*Primary Examiner* — Emma K Frick
(74) *Attorney, Agent, or Firm* — PROCOPIO, CORY, HARGREAVES & SAVITCH LLP

(57) ABSTRACT

There is provided an electric balance bike including: a front wheel and a rear wheel; an electric drive source configured to rotationally drive at least one of the front wheel and the rear wheel; a first frame holding the front wheel and a second frame holding the rear wheel; a main frame connecting the first frame and the second frame and having a closed cross section; and an electrical device disposed to an inside of the closed cross section of the main frame in a state of being separated upward from an inner bottom surface of the closed cross section, the electrical device being configured to cause the drive source to generate power for which the drive source rotationally drives.

12 Claims, 10 Drawing Sheets

(56) References Cited

U.S. PATENT DOCUMENTS

| | | | |
|---|---|---|---|
| 11,396,346 B2 * | 7/2022 | De La Serna Gonzalez ............... | B62J 11/19 |
| 11,945,316 B2 * | 4/2024 | Bender ................... | B60L 50/66 |
| D1,027,733 S * | 5/2024 | Matsuzaki ................... | D12/111 |
| 2013/0256049 A1 * | 10/2013 | Matsuda .................. | B62J 43/16 180/220 |
| 2015/0130150 A1 | 5/2015 | O'Connell | |
| 2016/0152294 A1 | 6/2016 | Kwag et al. | |
| 2019/0229307 A1 * | 7/2019 | Mitsuyasu .......... | H01M 50/213 |
| 2022/0281552 A1 * | 9/2022 | Liao .................... | H01M 50/249 |
| 2023/0068636 A1 * | 3/2023 | Matsuzaki ................ | B62J 1/08 |

FOREIGN PATENT DOCUMENTS

| | | | |
|---|---|---|---|
| JP | 2018-034696 A | 3/2018 | |
| JP | 2019-149364 A | 9/2019 | |

\* cited by examiner

ELECTRIC BALANCE BIKE

CROSS-REFERENCE TO RELATED APPLICATIONS

This application is based on and claims priority under 35 USC 119 from Japanese Patent Application No. 2021-138116 filed on Aug. 26, 2021, the contents of which are incorporated herein by reference.

TECHNICAL FIELD

The present disclosure relates to an electric balance bike capable of electric traveling.

BACKGROUND ART

There is known a balance bike disclosed in US2015/0130150A1. The balance bike is a kind of a bicycle for children, and a crank is omitted in order to travel while kicking the ground. In recent years, an electric balance bike equipped with a motor, a battery, and a controller has also been commercialized.

Electrical devices such as the battery and the controller are desired to that avoid contact with moisture as much as possible. On the other hand, it is necessary to assume a situation in which the balance bike is exposed to moisture such as use in rain or splashed water from a road surface. Therefore, when the balance bike is electrically operated, a waterproof measure for the electrical devices is desired.

SUMMARY OF INVENTION

The present disclosure relates to an electric balance bike provided with an electrical device including a battery, which can improve waterproofness of the electrical device.

According to an illustrative aspect of the present disclosure, an electric balance bike includes: a front wheel and a rear wheel; an electric drive source configured to rotationally drive at least one of the front wheel and the rear wheel; a first frame holding the front wheel and a second frame holding the rear wheel; a main frame connecting the first frame and the second frame and having a closed cross section; and an electrical device disposed to an inside of the closed cross section of the main frame in a state of being separated upward from an inner bottom surface of the closed cross section, the electrical device being configured to cause the drive source to generate power for which the drive source rotationally drives.

According to the present disclosure, in an electric balance bike provided with an electrical device including a battery, waterproofness for the electrical device can be improved.

BRIEF DESCRIPTION OF DRAWINGS

FIG. 4 is a perspective view of a main part of the electric balance bike in which a part of a main frame that accommodates electrical devices is seen through.

DESCRIPTION OF EMBODIMENTS

Hereinafter, an embodiment of an electric balance bike according to the present disclosure will be described in detail with reference to the drawings. The electric balance bike disclosed in the present disclosure (hereinafter, simply referred to as a balance bike) is mainly a kid's bike for children, and is capable of self-traveling in which an occupant travels while kicking the ground with his/her legs, and electric traveling.

[Overall Configuration of Electric Balance Bike]

Figure 1:
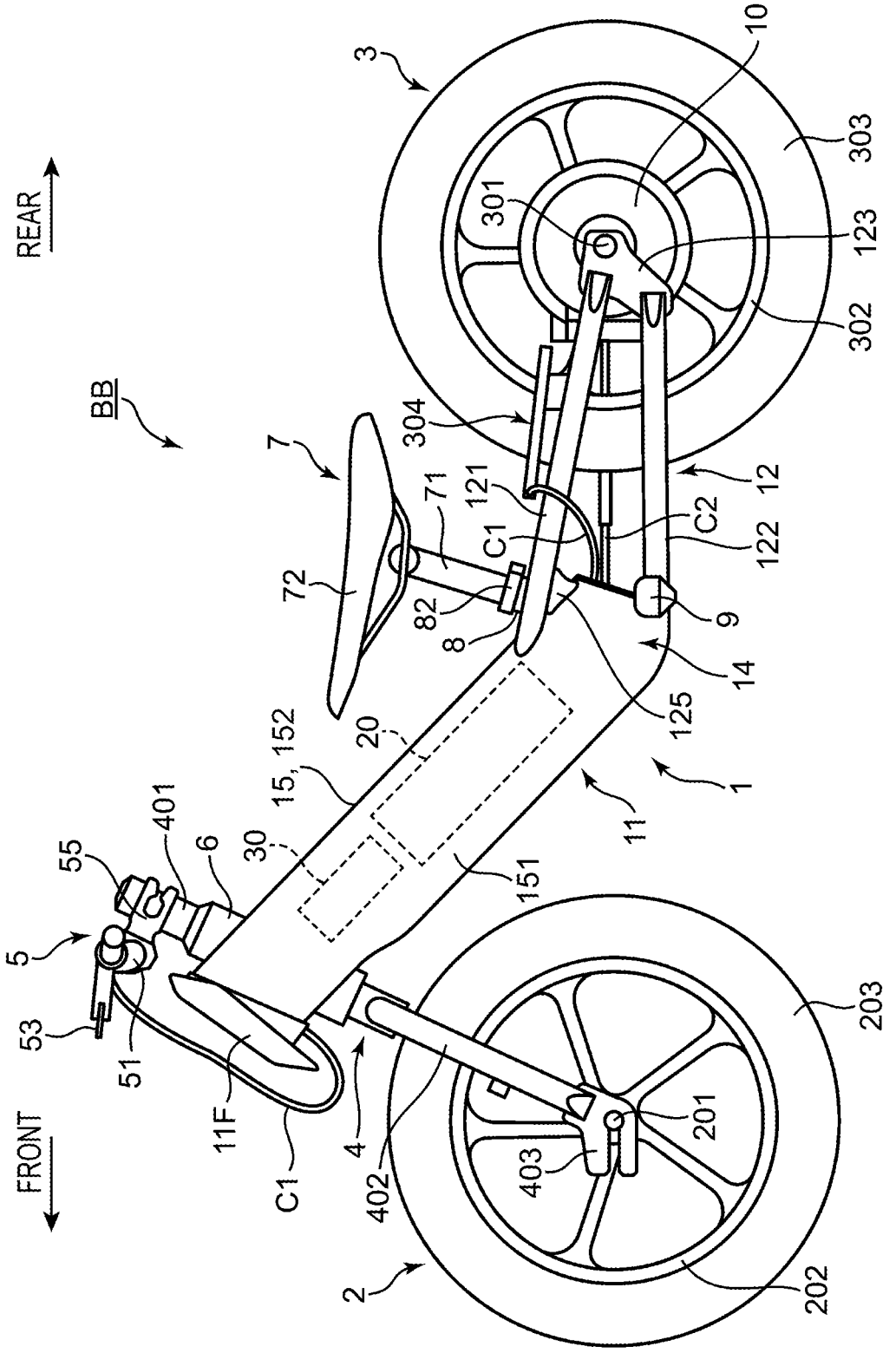
FIG. 1 is a side view of an electric balance bike according to an embodiment of the present disclosure.
Figure 2:
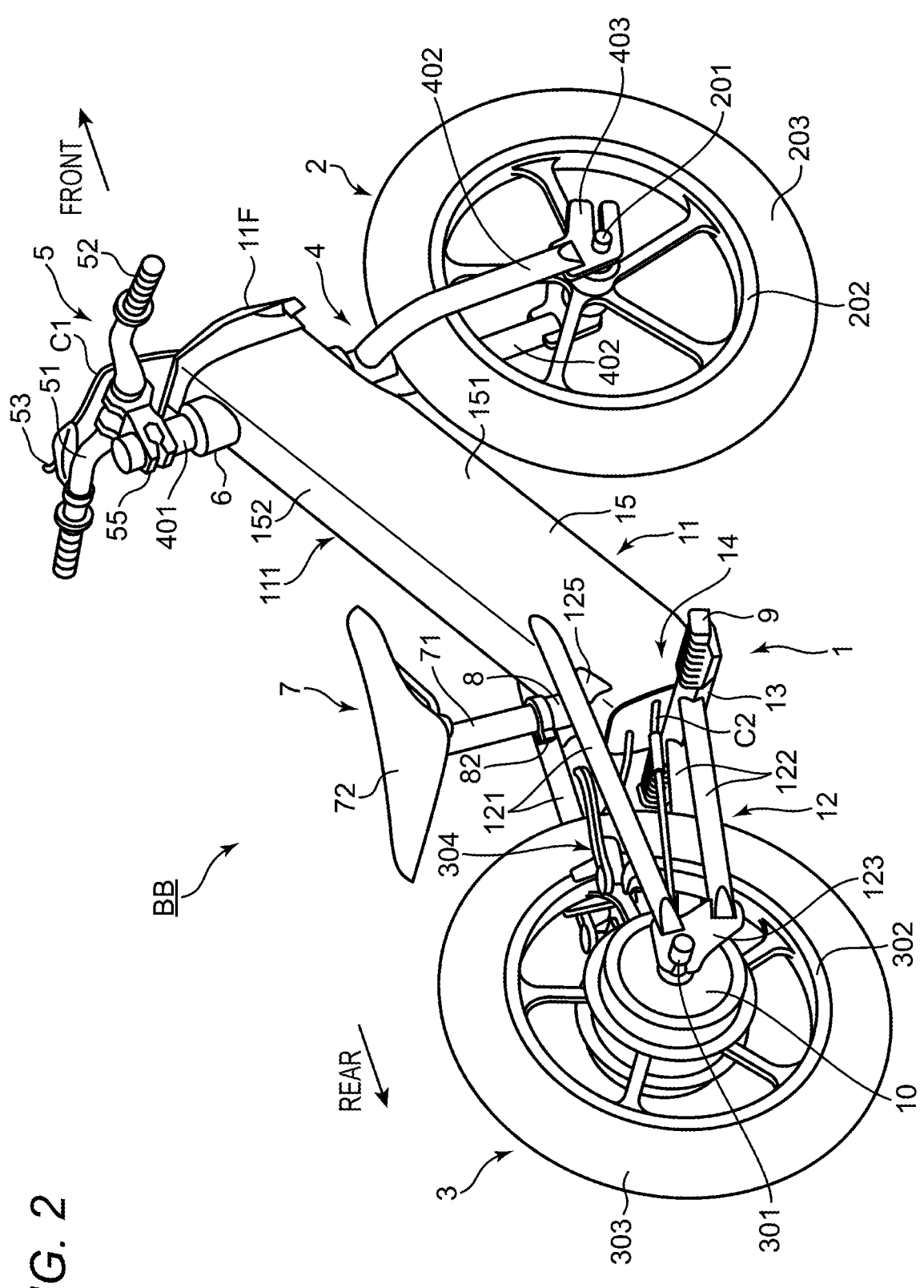
FIG. 2 is a perspective view of the electric balance bike as viewed obliquely from an upper rear side.
Figure 3:
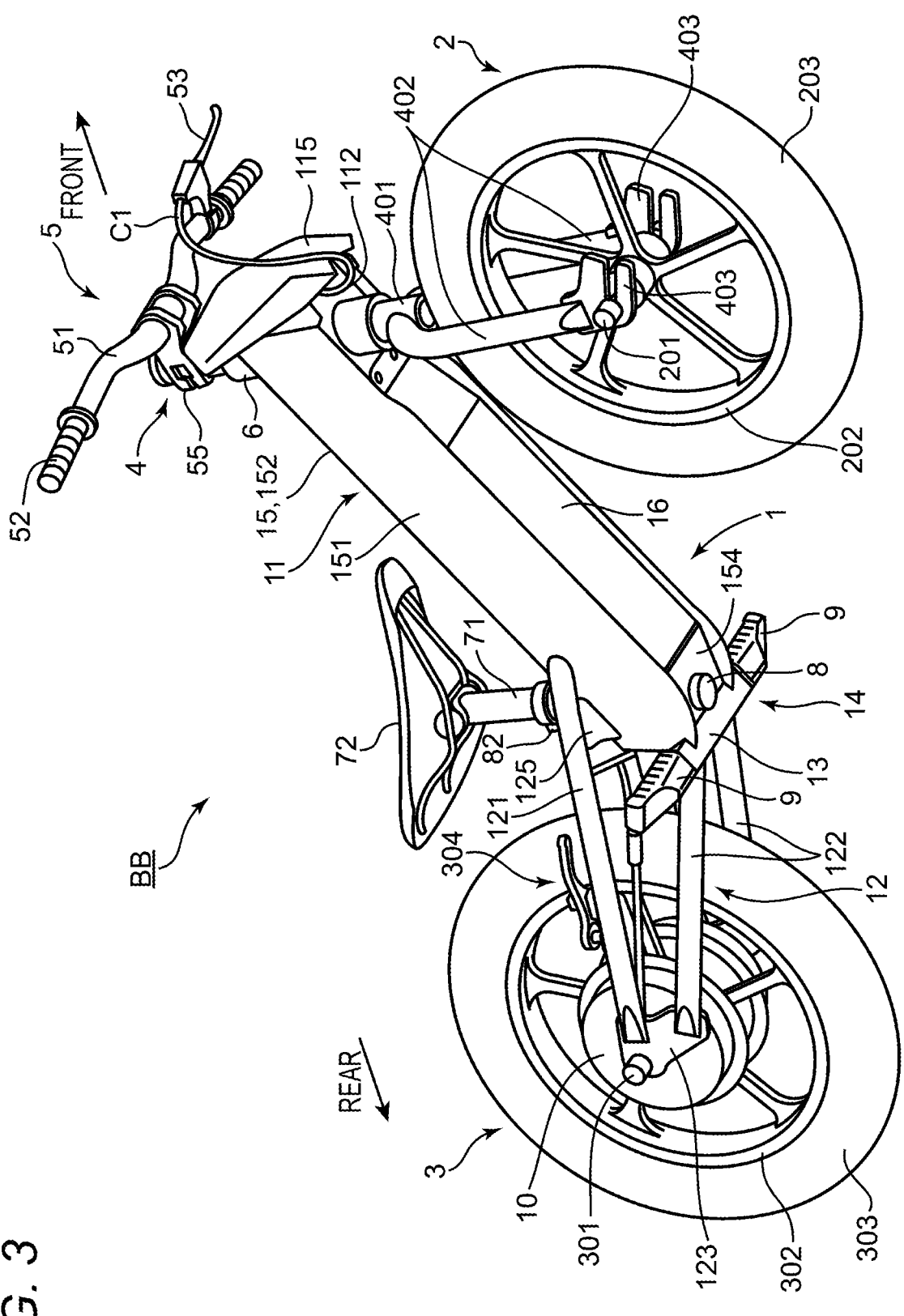
FIG. 3 is a perspective view of the electric balance bike as viewed obliquely from a lower front side.

FIG. 1 is a side view of a balance bike BB according to the embodiment of the present disclosure, FIG. 2 is a perspective view of the balance bike BB as viewed obliquely from an upper rear side, and FIG. 3 is a perspective view of the balance bike BB as viewed obliquely from a lower front side. The balance bike BB includes a body frame 1, a front wheel 2, a rear wheel 3, a front fork 4 (first frame), a handle 5, a head tube 6, a seat 7, a seat tube 8, a pair of left and right steps 9, and a motor 10 (electric drive source).

The body frame 1 is a frame that forms a main part of a vehicle body of the balance bike BB, and includes a main frame 11 on a front side, a rear frame 12 (second frame) on a rear side, and a coupling member 13 that couples the frames 11, 12 (see FIGS. 2 and 3). The main frame 11 extends rearward from the head tube 6 while being inclined downward. The rear frame 12 extends rearward from a rear end of the main frame 11 at an angle closer to a horizontal direction than the main frame 11. The main frame 11 and the rear frame 12 are joined to each other by welding via the coupling member 13. The body frame 1 has a shape bent so as to form a shallow V-shape in the side view. That is, a portion where the main frame 11 and the rear frame 12 are connected to each other forms a bent portion 14 that is bent so as to protrude downward. As will be described in detail later, the main frame 11 has a closed cross-sectional structure.

The front wheel 2 includes an axle 201, a wheel body 202, and a tire 203. The axle 201 is a shaft that functions as a rotation center of the front wheel 2, and is fixed to a lower end portion of the front fork 4. The wheel body 202 is a rigid component rotatable about the axle 201, and is attached to the axle 201 via a bearing. The tire 203 is a ring-shaped rubber component attached to an outer peripheral portion (rim) of the wheel body 202.

The front fork 4 is a member that holds the front wheel 2 and couples the handle 5 and the front wheel 2. The front fork 4 includes a stem portion 401 and a pair of left and right leg portions 402. The stem portion 401 is a pipe member extending from the handle 5 toward the front wheel 2, and extends in an upper-lower direction in a posture in which the stem portion 401 is inclined so as to slightly tilt rearward. An intermediate portion of the stem portion 401 is coaxially inserted into the head tube 6. The pair of leg portions 402 extend downward from a lower end portion of the stem portion 401 while branching in a left-right direction. A fixing portion 403 is provided at a lower end portion of each leg portion 402. Each of both end portions of the axle 201 of the front wheel 2 is fixed to the fixing portion 403 via a fastening member or the like.

The handle 5 includes a handlebar 51, an accelerator grip 52, and a brake lever 53. The handlebar 51 is a bar member that is provided to steer the front wheel 2 and extends in the left-right direction (vehicle width direction), and is fixed to an upper end portion of the stem portion 401 of the front fork 4 via a bracket 55. When the handlebar 51 is steered in a front-rear direction, the front fork 4 rotates about an axis thereof to change a direction of the front wheel 2, thereby changing a traveling direction of the balance bike BB. The accelerator grip 52 is a grip that is twisted and operated by the occupant when the balance bike BB is caused to travel electrically. The accelerator grip 52 is attached to a right side portion of the handlebar 51 so as to be rotatable about an axis thereof extending in the left-right direction to allow a twisting operation. The brake lever 53 is a lever that is gripped and operated by the occupant when the balance bike BB is decelerated, and is attached to a left side portion of the handlebar 51.

The head tube 6 is a cylindrical member capable of receiving the stem portion 401 of the front fork 4, and is fixed to a front end portion of the main frame 11. Specifically, the head tube 6 is fixed to the main frame 11 in a state of penetrating the front end portion of the main frame 11 in the upper-lower direction. The head tube 6 holds the stem portion 401 while allowing the stem portion 401 to rotate about an axis thereof. In other words, the head tube 6 steerably holds the front wheel 2 via the front fork 4.

The seat 7 includes a seat post 71 and a saddle 72. The seat post 71 is a pipe member extending in the upper-lower direction in a posture in which the seat post 71 is inclined so as to slightly tilt rearward. At least a lower portion of the seat post 71 is coaxially inserted into the seat tube 8. The saddle 72 is a component that supports the buttocks of the occupant riding on the balance bike BB, and is detachably fixed to an upper end portion of the seat post 71.

The seat tube 8 is a cylindrical member capable of receiving the seat post 71, and is fixed to a rear end portion of the main frame 11. Specifically, the seat tube 8 is fixed to the main frame 11 in a state of penetrating the rear end portion of the main frame 11 in the upper-lower direction. As described above, the rear end portion of the main frame 11 is a portion that is connected non-parallel to a front end portion of the rear frame 12, and forms the bent portion 14 of the body frame 1 in combination with the front end portion of the rear frame 12. The seat tube 8 is fixed to the bent portion 14.

The seat tube 8 holds the seat post 71 slidably in an axial direction (upper-lower direction) such that a height of the seat 7 can be changed. A clamp 82 is attached to an upper end of the seat tube 8. The clamp 82 is a locking device that locks the seat 7 at a required height, and can be switched between a released state and a locked state. That is, the clamp 82 allows the seat post 71 to slide in the released state, and clamps the seat post 71 to prohibit the seat post 71 from sliding in the locked state. By using such a clamp 82, the occupant can freely adjust the height of the saddle 72 of the seat 7.

The pair of steps 9 are components on which the occupant places his/her feet. A root portion of the step 9 is inserted into and fixed to an end portion of the coupling member 13 of the body frame 1 in a vehicle width direction. The step 9 protrudes outward in the vehicle width direction from the coupling member 13.

The rear wheel 3 includes an axle 301, a wheel body 302, and a tire 303. The axle 301 is a shaft that functions as a rotation center of the rear wheel 3, and is fixed to a rear end portion of the rear frame 12. The wheel body 302 is a rigid component rotatable about the axle 301, and is attached to the axle 301 via the motor 10. The tire 303 is a ring-shaped rubber component attached to an outer peripheral portion (rim) of the wheel body 302.

The front end portion of the rear frame 12 is connected to the main frame 11, and the rear end portion thereof holds the rear wheel 3. The rear frame 12 includes a pair of left and right upper pipes 121, a pair of left and right lower pipes 122, and a pair of left and right end plates 123. The pair of end plates 123 are portions to which both end portions of the axle 301 of the rear wheel 3 are fixed via fastening members or the like, respectively. The pair of upper pipes 121 are pipe members extending forward from upper portions of the respective end plates 123. The pair of lower pipes 122 are pipe members extending forward from lower portions of the respective end plates 123. A front end portion of each upper pipe 121 is joined to the rear end portion of the main frame 11 by welding. A gusset plate 125 is attached between the front end portion of each upper pipe 121 and the main frame 11. A front end portion of each lower pipe 122 is joined to the rear end portion of the main frame 11 via the coupling member 13.

A brake 304 that applies a braking force to the rear wheel 3 is attached to the rear frame 12. The brake 304 is mechanically connected to the brake lever 53 via a brake cable C1 routed so as to pass through inside of the main frame 11. When the occupant performs an operation of gripping the brake lever 53, an operation force to the brake lever 53 is transmitted to the brake 304 via the brake cable C1. Thereby, a braking force for restricting rotation of the rear wheel 3 is applied from the brake 304 to the wheel body 302.

The motor 10 is an electric motor that is driven by being supplied with electric power. The motor 10 is a so-called in-wheel motor, and is coaxially attached to a central portion (hub) of the wheel body 302 so as to directly rotate the rear wheel 3. Although not shown in detail, the motor 10 includes a stator that is not rotatable with respect to the axle 301 and a rotor that rotates with respect to the stator when energized. Rotation of the rotor is transmitted to the wheel body 302 via an output shaft coaxial with the wheel body 302, whereby the rear wheel 3 is rotationally driven. Simplification and weight reduction of a drive system are achieved by using an in-wheel motor as the motor 10. The motor 10 may be disposed to rotationally drive at least one of the front wheel 2 and the rear wheel 3, and may be disposed to rotationally drive the front wheel 2.

As indicated by virtual lines in FIG. 1, electrical devices including a battery 20 and a controller 30 are accommodated inside the main frame 11. The battery 20 and the controller 30 are devices that cause the motor 10 to generate power for the rotational drive. The battery 20 is a rechargeable secondary battery, and is a power storage device that supplies electric power to the motor 10. The controller 30 is a control device that controls a rotation operation of the motor 10. The controller 30 is electrically connected to the motor 10 via a power supply cable C2 routed so as to pass through the inside of the main frame 11, and is electrically connected to the accelerator grip 52 via another control cable. When the occupant performs an operation of twisting the accelerator grip 52, a signal indicating an operation amount or the like of the twisting operation is input to the controller 30. The controller 30 controls power supply from the battery 20 to the motor 10 such that the motor 10 is rotationally driven at a desired rotation speed based on the input operation signal.

[Support Structure for Electrical Devices in Main Frame]

Figure 4:
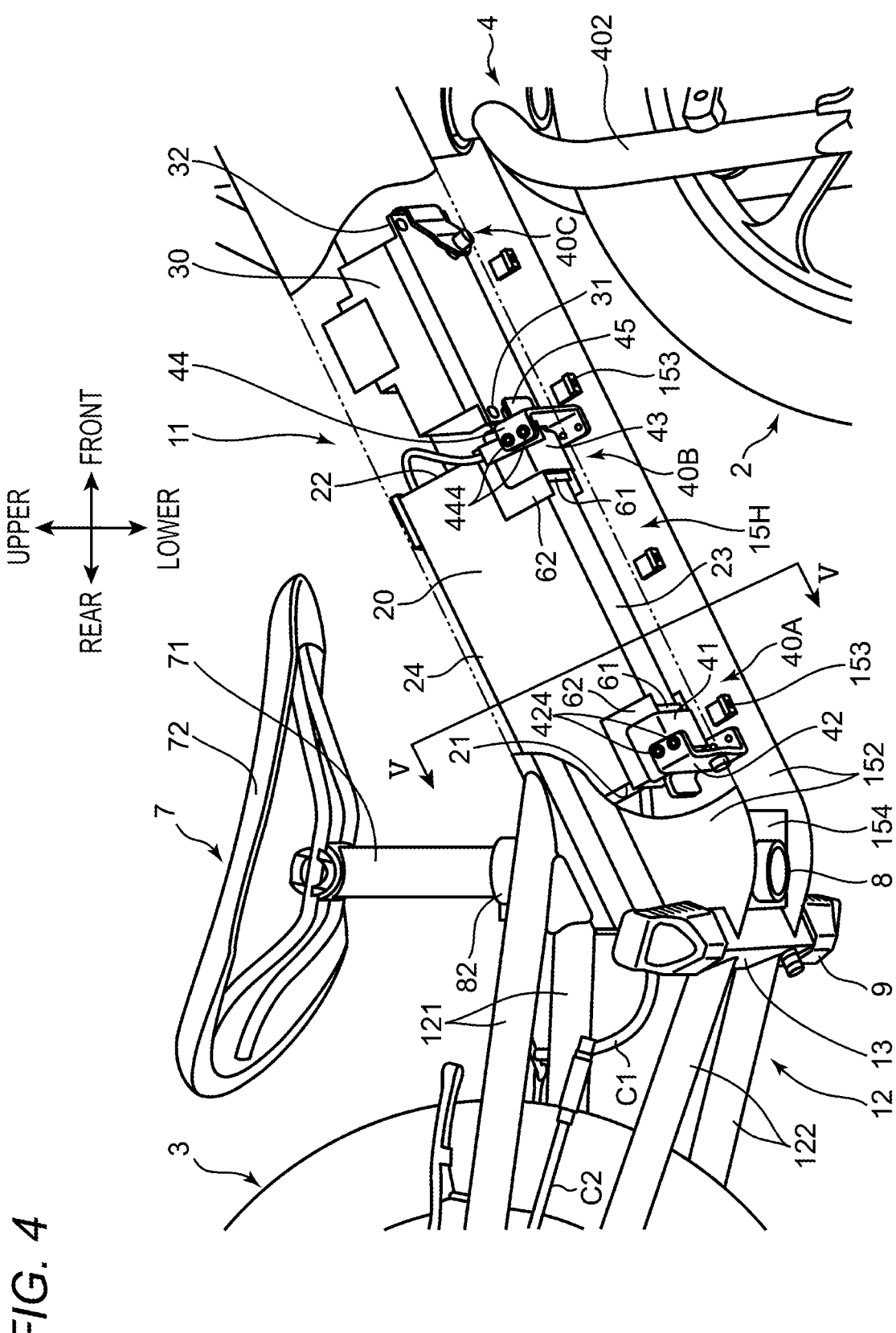
Figure 5:
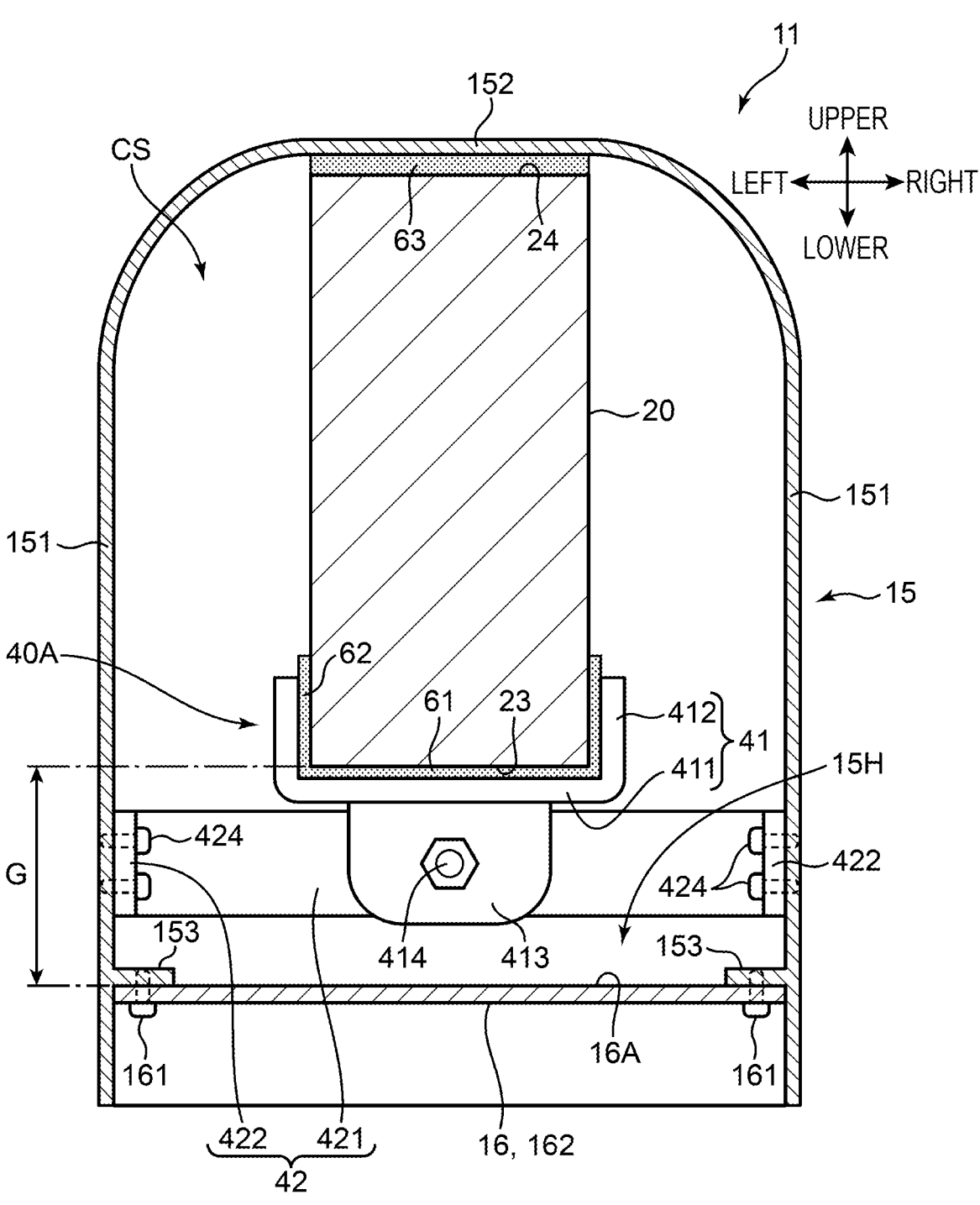
FIG. 5 is a cross-sectional view taken along a line V-V in FIG. 4.

Next, a support structure for the electrical devices in the main frame 11 will be described in detail. FIG. 4 is a perspective view of a main part of the balance bike BB in which a part of the main frame 11 that accommodates the electrical devices is in seen through, and FIG. 5 is a cross-sectional view taken along a line V-V in FIG. 4. In the present embodiment, the battery 20 and the controller 30 as the electrical devices are supported in a floating state in the main frame 11 in order to improve waterproofness for the battery 20 and the controller 30. Hereinafter, a structure related to the floating support will be described.

<Details of Main Frame>

The main frame 11 is a frame that couples the front fork 4 (first frame) and the head tube 6 that hold the front wheel 2, and the rear frame 12 (second frame) that holds the rear wheel 3, and has the closed cross-sectional structure. The main frame 11 is formed of a composite body of a main body portion 15 having an inverted U-shaped cross section and a flat plate-shaped bottom cover 16 (cover).

The main body portion 15 has a lower surface opening 15H (opening) that opens downward. The bottom cover 16 closes the lower surface opening 15H. Since the lower surface opening 15H is closed by the bottom cover 16, a closed cross section CS is formed inside the main frame 11. The battery 20 and the controller 30 are disposed in the closed cross section CS. By removing the bottom cover 16, an operator can get access to an area of the closed cross section CS through the lower surface opening 15H. That is, the lower surface opening 15H is an opening for taking out the battery 20 and the controller 30 from the closed cross section CS or for mounting the battery 20 and the controller 30 to the closed cross section CS.

The main body portion 15 is a metal frame member, and includes a pair of side plates 151, a top plate 152, and a plurality of brackets 153. The pair of side plates 151 are flat plates facing each other in parallel with a predetermined interval therebetween in the left-right direction, and extend in the front-rear direction. The predetermined interval is set to be longer than at least left-right widths of the battery 20 and the controller 30. A rear bottom plate 154 and a front bottom plate 155 are attached to a rear side and a front side of the main body portion 15, respectively. The rear bottom plate 154 is joined to the pair of side plates 151 so as to close the lower surface opening 15H at a rear end portion of the main body portion 15. The front bottom plate 155 is joined to the pair of side plates 151 so as to close the lower surface opening 15H at a front end portion of the main body portion 15.

The top plate 152 connects upper end portions of the pair of side plates 151. A through hole through which the head tube 6 passes is formed on a front side of the top plate 152. In addition, a through hole through which the seat tube 8 passes is formed on a rear side of the top plate 152. The rear bottom plate 154 also has a through hole through which the head tube 6 passes, and the front bottom plate 155 also has a through hole through which the seat tube 8 passes. The head tube 6 is inserted into the through hole on the front side of the top plate 152 and the through hole of the front bottom plate 155, and is joined to peripheral edge portions of these through holes by welding. The seat tube 8 is inserted into the through hole on the rear side of the top plate 152 and the through hole of the rear bottom plate 154, and is joined to peripheral edge portions of these through holes by welding.

The bracket 153 is a member serving as a mounting portion of the bottom cover 16 to the main body portion 15. The bracket 153 is a short plate piece protruding inward in a lateral direction from each inner wall surface of the pair of side plates 151, and has a screw hole. The bracket 153 is attached to a position close to a lower end edge of the side plate 151. The bracket 153 can be provided on the side plate 151 by, for example, welding an L-shaped frame piece to the inner wall surface of the side plate 151. The plurality of brackets 153 are arranged at predetermined intervals in the front-rear direction. In an example in FIG. 4, four brackets 153 are arranged at substantially equal intervals.

The bottom cover 16 is a resin flat plate having a left-right width substantially equal to a distance between the pair of side plates 151. Through holes are formed in vicinity of left and right side edges of the bottom cover 16 in accordance with positions of the brackets 153. By fastening a setscrew 161 to the screw hole of the bracket 153 through the through hole, the bottom cover 16 is attached to the main body portion 15, and the lower surface opening 15H is closed. By attachment of the bottom cover 16, a space in the main body portion 15 in which the battery 20 and the controller 30 are accommodated becomes the closed cross section CS. The bottom cover 16 prevents entry of rainwater from the lower surface opening 15H.

When the operator gets access to the battery 20 or the controller 30 in the closed cross section CS for maintenance, replacement, or the like, the operator only needs to remove the fastened screw 161 from the bracket 153, and the work is easy. The bottom cover 16 is disposed on a bottom surface side of the main body portion 15, and is located at a position that is difficult for a viewer of the balance bike BB to see. Therefore, there is also an advantage that a design is not restricted by presence of the lower surface opening 15H and the bottom cover 16, and an aesthetic appearance of the body frame 1 is easily improved.

Figure 7:
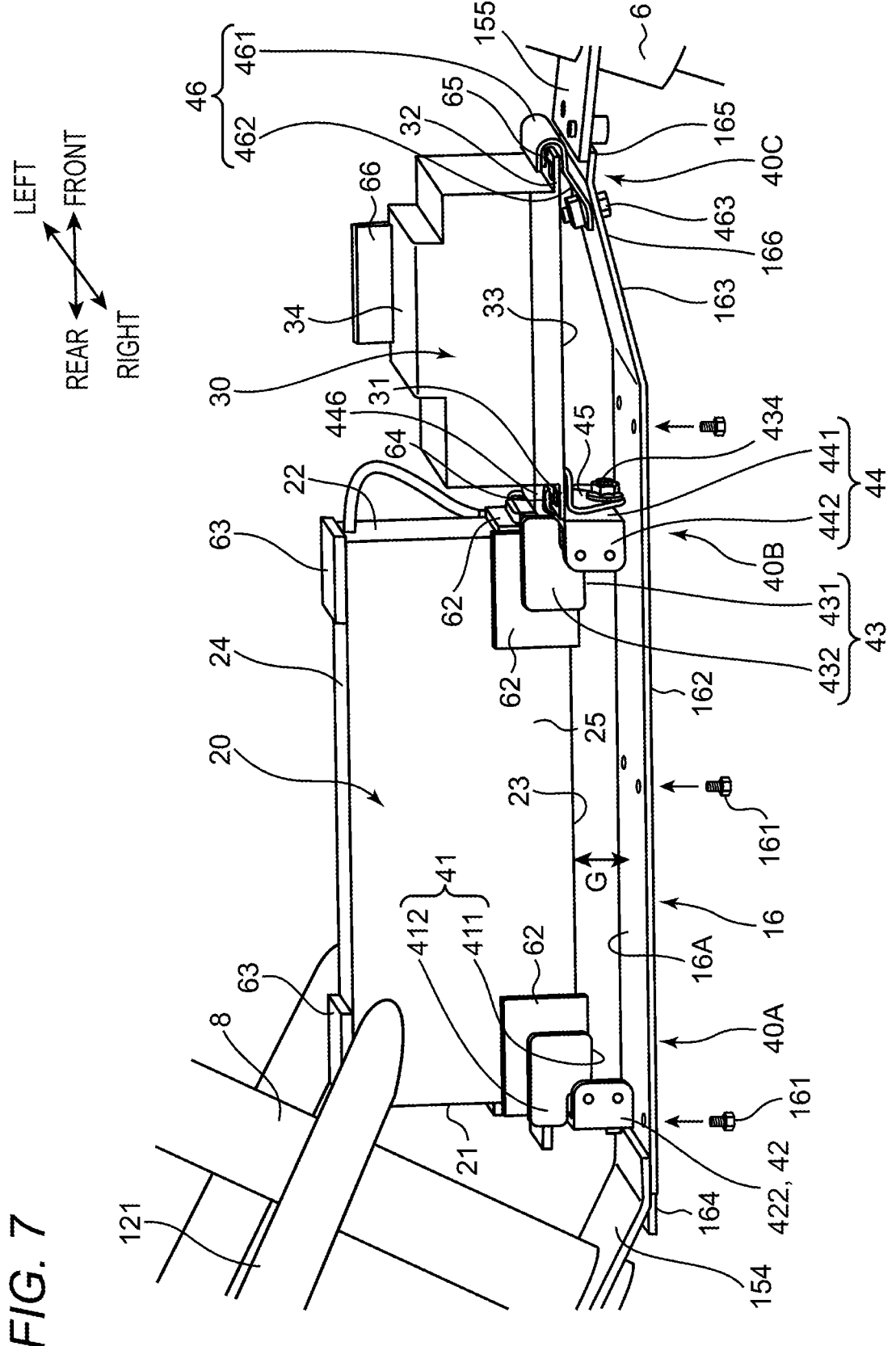
FIG. 7 is a perspective view showing a battery, a controller, support members for the battery and the controller, and the bottom cover.

With reference to FIG. 7, the bottom cover 16 includes a flat plate portion 162 and an inclined portion 163. The flat plate portion 162 faces an entire bottom surface of the battery 20 and a bottom surface of a rear half of the controller 30. The inclined portion 163 is continuous with a front end of the flat plate portion 162 and is inclined upward with respect to a direction in which the flat plate portion 162 extends. A rear end portion 164 of the flat plate portion 162 is in contact with the rear bottom plate 154 of the main body portion 15. A front end portion 165 of the inclined portion 163 is in contact with the front bottom plate 155 of the main body portion 15. The rear end portion 164 and the front end portion 165 may be fixed to the rear bottom plate 154 and the front bottom plate 155, respectively, by screwing or the like.

In the present embodiment, the bottom cover 16 is disposed above lower ends of the pair of side plates 151. Specifically, the rear end portion 164 of the bottom cover 16 is covered with a lower end portion of the side plate 151. Therefore, the bottom cover 16 is protected by the side plate 151, and damage to the bottom cover 16 due to collision with an obstacle can be prevented. Providing the bottom cover 16 can prevent entry of rainwater, mud, or the like splashed up from the front wheel 2 into the main frame 11.

<Support Member for Electrical Devices>

Figure 6:
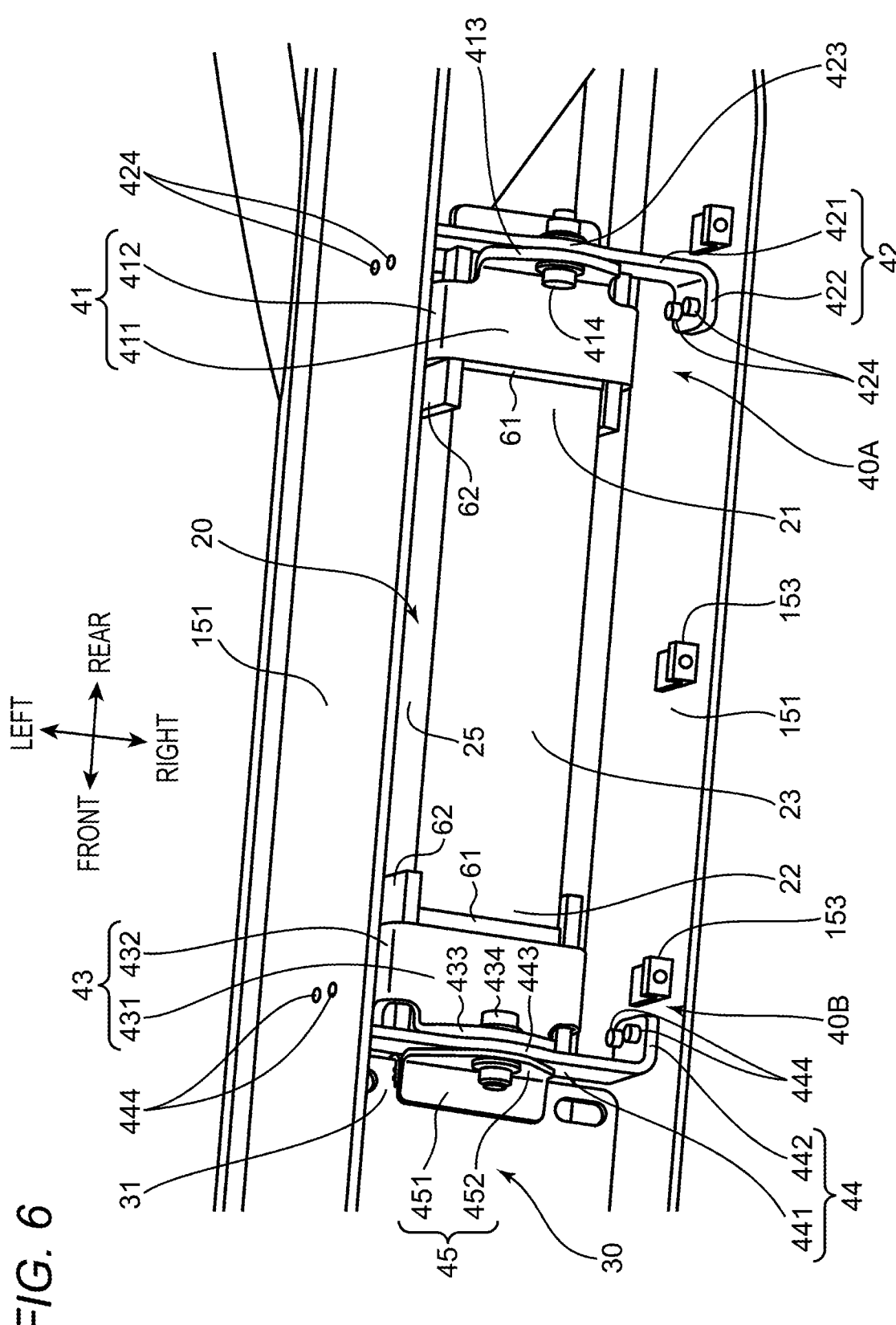
FIG. 6 is a perspective view of a state in which a bottom cover of the main frame is removed.
Figure 8:
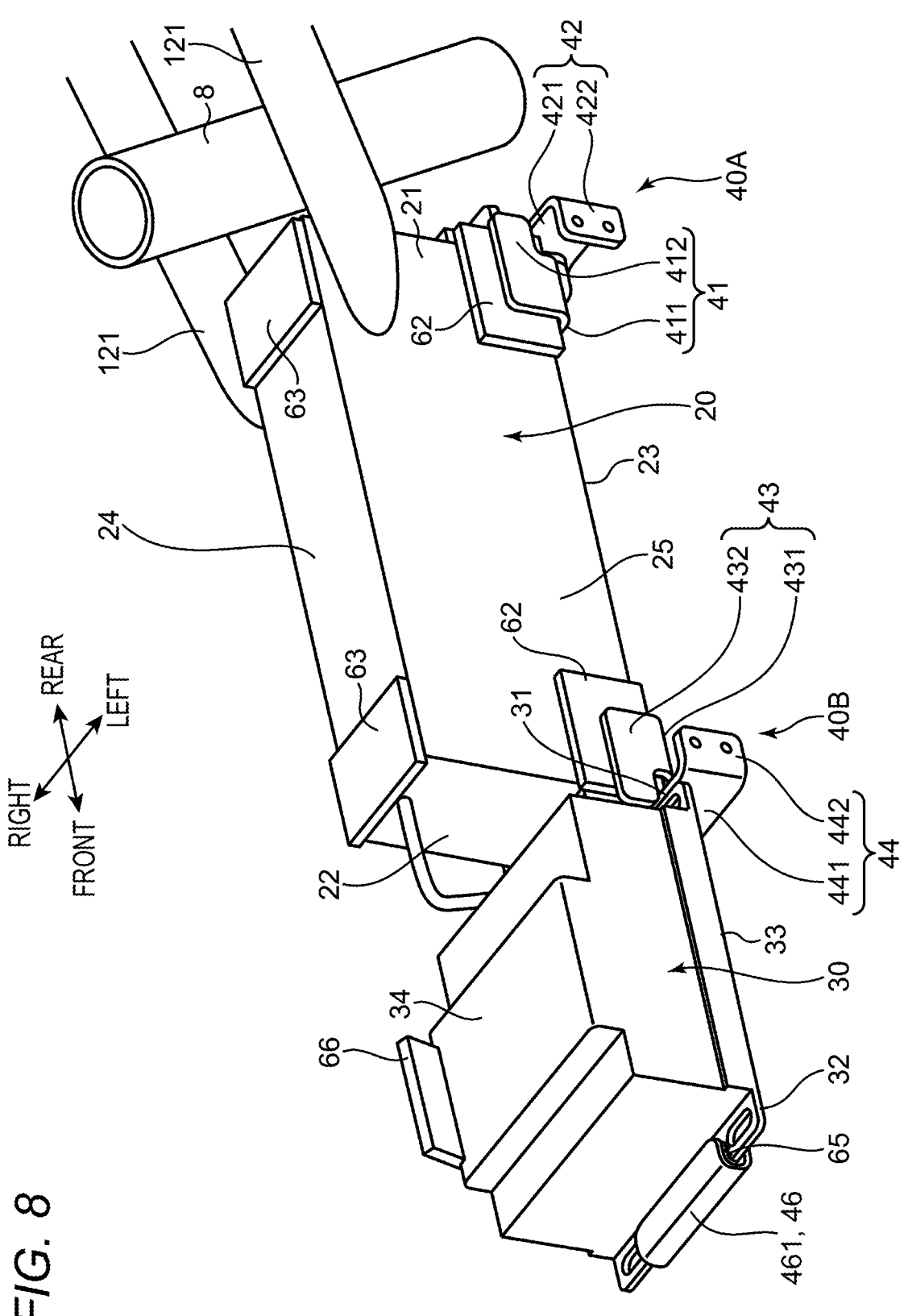
FIG. 8 is a perspective view showing the battery, the controller, and the support members for the battery and the controller.
Figure 9:
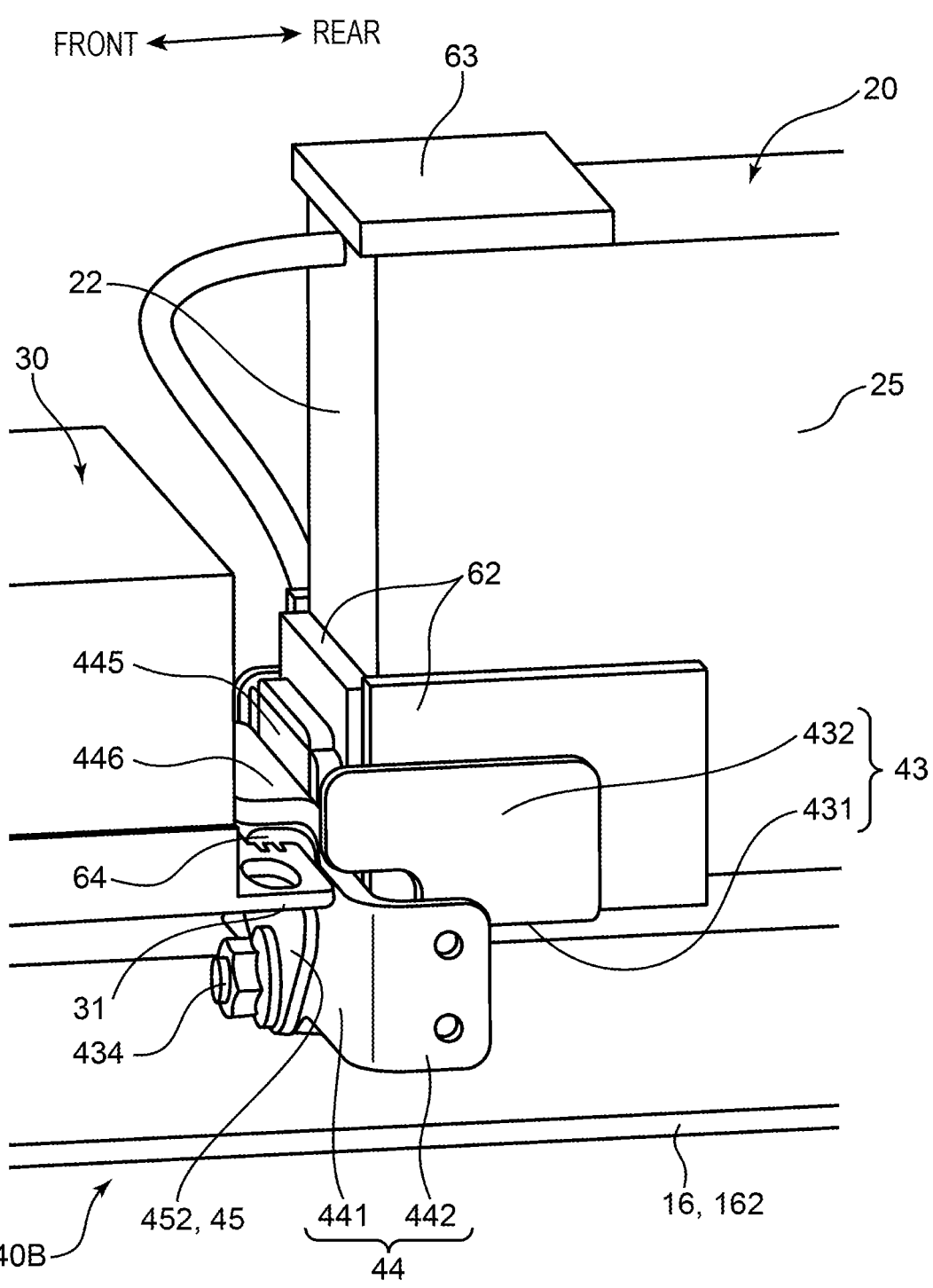
FIG. 9 is a perspective view showing a coupling support portion between the battery and the controller.

The battery 20 and the controller 30 are disposed in the closed cross section CS of the main frame 11 in a state of being separated upward from an inner bottom surface of the closed cross section CS, that is, an upper surface 16A of the bottom cover 16 in the present embodiment. Such a floating arrangement is implemented by a first support portion 40A, a second support portion 40B, and a third support portion 40C arranged side by side in the front-rear direction. This point will be described with reference to FIGS. 6 to 9 in addition to FIGS. 4 and 5. FIG. 6 is a perspective view showing a state in which the bottom cover 16 is removed from the main body portion 15 of the main frame 11, and FIG. 7 is a perspective view showing a state in which the main body portion 15 is removed. FIG. 8 is a perspective view showing the battery 20, the controller 30, and the three support portions 40A, 40B, 40C. FIG. 9 is a perspective view showing a coupling support portion between the battery 20 and the controller 30.

The battery 20 according to the present embodiment has a rectangular parallelepiped shape that is relatively narrow in the left-right direction and long in the front-rear direction. The controller 30 has a substantially rectangular parallelepiped shape whose left-right width is wider than that of battery 20 and whose front-rear width is shorter than that of the battery 20. A rear end flange 31 extends rearward from a rear end lower portion of the controller 30, and a front end flange 32 extends forward from a front end lower portion of the controller 30.

The first support portion 40A supports a rear end portion 21 of the battery 20. The second support portion 40B supports a front end portion 22 of the battery 20 and the rear end flange 31 of the controller 30. The third support portion 40C supports the front end flange 32 of the controller 30. Support bases of the first support portion 40A and the second support portion 40B are the pair of side plates 151 of the main frame 11. That is, the rear end portion 21 and the front end portion 22 of the battery 20 and the rear end flange 31 of the controller 30 are supported by a lateral suspension manner using the side plates 151 without depending on the bottom cover 16. According to the lateral suspension manner, there is an advantage that a supporting state in which the electrical devices float from the bottom cover 16 can be easily constructed. On the other hand, a support base of the third support portion 40C is the inclined portion 163 of the bottom cover 16. Of course, the support base of the third support portion 40C may also be the pair of side plates 151. In this case, the bottom cover 16 may be formed of a simple plate member on which a support member or the like is not mounted, and the bottom cover 16 is easily attachable and detachable.

Structures of the three support portions 40A, 40B, 40C will be described in detail. With reference mainly to FIGS. 6 to 8, the first support portion 40A includes a first holding member 41 and a first support member 42 (support member). The first holding member 41 includes a horizontal plate 411, a pair of left and right vertical plates 412, and a coupling plate 413. The horizontal plate 411 is a horizontal plate that supports the bottom surface 23 at the rear end portion 21 of the battery 20. The pair of vertical plates 412 are bent pieces respectively erected from both left and right end edges of the horizontal plate 411, and hold left and right side surfaces 25 of the battery 20. The coupling plate 413 (FIG. 6) is a bent piece hanging downward from a rear end edge of the horizontal plate 411. The coupling plate 413 is a member that couples the first holding member 41 to the first support member 42.

The first support member 42 is a member that supports the rear end portion 21 of the battery 20 via the first holding member 41. The first support member 42 includes a beam plate 421, a pair of left and right stop plates 422, and a bulging portion 423. The beam plate 421 extends in the left-right direction so as to bridge between the pair of side plates 151. The pair of stop plates 422 are bent pieces extending forward from both left and right ends of the beam plate 421, respectively. A through hole through which a fixing screw 424 passes is formed in the stop plate 422. The bulging portion 423 is a portion that extends downward from a center of the beam plate 421 in the left-right direction.

The left and right stop plates 422 are fixed to the left and right side plates 151, respectively. The side plate 151 is provided with a screw hole into which the fixing screw 424 can be screwed. The fixing screw 424 is screwed into the screw hole in a state in which the screw hole and the through hole of the stop plate 422 are aligned with each other. By this screwing, the first support member 42 is fixed to the side plate 151. Each of the coupling plate 413 of the first holding member 41 and the bulging portion 423 of the first support member 42 includes a through hole through which a fastening bolt 414 passes. The through holes are aligned with each other, the bulging portion 423 is superposed on the coupling plate 413, and the fastening bolt 414 is inserted into the through holes to be fastened, whereby both the bulging portion 423 and the coupling plate 413 are coupled to each other.

By the above coupling, the first holding member 41 supporting the rear end portion 21 of the battery 20 is supported by the first support member 42 having the side plate 151 as a support base. This support form creates a supporting state in which the battery 20 floats from the bottom cover 16. As shown in FIGS. 5 and 7, a floating gap G exists between the bottom surface 23 of the battery 20 supported by the first support portion 40A and the upper surface 16A of the bottom cover 16. When rainwater or the like enters the closed cross section CS of the main frame 11 or when water condensation occurs, moisture flows on the upper surface 16A of the bottom cover 16 or stays on the upper surface 16A. However, since the battery 20 is supported with the floating gap G, it is difficult for the battery 20 to come into contact with the moisture.

The second support portion 40B has a configuration the same as that of the first support portion 40A in a support structure for the battery 20, but has an additional configuration to support the controller 30. The second support portion 40B includes a second holding member 43, a second support member 44 (support member), and a support bracket 45. The second holding member 43 and the second support member 44 are members similar to the first holding member 41 and the first support member 42 described above, and support the front end portion 22 of the battery 20. The support bracket 45 supports the rear end flange 31 of the controller 30.

The second holding member 43 includes a horizontal plate 431, a pair of vertical plates 432, and a coupling plate 433. The horizontal plate 431 supports the bottom surface 23 at the front end portion 22 of the battery 20. The vertical plates 432 hold the left and right side surfaces 25 at the front end portion 22 of the battery 20. The coupling plate 433 is formed of a bent piece hanging downward from a front end edge of the horizontal plate 431.

The second support member 44 is a member that supports the front end portion 22 of the battery 20 via the second holding member 43. The second support member 44 includes a beam plate 441, a pair of left and right stop plates 442, and a bulging portion 443. The beam plate 441 extends in the left-right direction so as to bridge between the pair of side plates 151. The pair of stop plates 442 are bent pieces extending rearward from both left and right ends of the beam plate 441, respectively. A through hole through which a fixing screw 444 passes is formed in the stop plate 442. The bulging portion 443 is a portion that extends downward from a center of the beam plate 441 in the left-right direction.

The left and right stop plates 442 are respectively fixed to the left and right side plates 151 by screwing the fixing screw 444. The coupling plate 433 of the second holding member 43 and the bulging portion 443 of the second support member 44 are coupled to each other by a fastening bolt 434. By this coupling, the second holding member 43 supporting the front end portion 22 of the battery 20 is also supported by the second support member 44 having the side plate 151 as a support base. By such support, the floating gap G is also formed between the bottom surface 23 on the front end portion 22 side of the battery 20 and the upper surface 16A of the bottom cover 16.

As shown in FIG. 9, the second support member 44 further includes a perpendicular plate 445 and a pressing plate 446. The perpendicular plate 445 is a plate piece extending upward from the center of the beam plate 441 in the left-right direction, and holds the front end portion 22 of the battery 20. The pressing plate 446 is a plate piece extending forward from the perpendicular plate 445.

The support bracket 45 is an L-shaped member in the side view and includes a support plate 451 and a hanging plate 452. The support plate 451 supports a back surface of the rear end flange 31 of the controller 30. The hanging plate 452 hangs downward from a rear end of the support plate 451. The hanging plate 452 is provided with a through hole through which the fastening bolt 434 can be inserted. The hanging plate 452 is aligned with the bulging portion 443 of the second support member 44, and is fastened together with the coupling plate 433 by the fastening bolt 434. The rear end flange 31 is supported such that a lower surface thereof is supported by the support plate 451 and an upper surface thereof is pressed by the pressing plate 446 of the second support member 44.

The third support portion 40C includes a third support member 46. The third support member 46 includes a locking portion 461 and an extending portion 462 that are integrally connected to each other. The locking portion 461 supports the front end flange 32 of the controller 30. The locking portion 461 has a curved shape so as to surround an upper surface of the front end flange 32 from a lower surface thereof. The extending portion 462 is a plate piece extending obliquely downward from the locking portion 461, and connects the inclined portion 163 of the bottom cover 16 and the locking portion 461. A bolt hole is formed in each of the extending portion 462 and the inclined portion 163, and the extending portion 462 and the inclined portion 163 are fixed to each other by a fastening bolt 463 using the bolt holes.

The rear end flange 31 is supported by the support bracket 45, and the front end flange 32 is supported by the third support member 46, whereby the bottom surface 33 of the controller 30 is also in a state of floating from the bottom cover 16. That is, in the closed cross section CS of the main frame 11, the controller 30 is supported in a state of being separated upward from the bottom cover 16 together with the battery 20. Therefore, waterproofness for the controller 30 can also be improved.

According to the support structure described above, the first support member 42 and the second support member 44 extend in the left-right direction, and both end portions of each of the first support member 42 and the second support member 44 are fixed to the pair of side plates 151 of the main frame 11, respectively. Therefore, the support members 42, 44 also function as reinforcing members that prevent deformation of the main frame 11. Therefore, even when the main body portion 15 of the main frame 11 has the lower surface opening 15H, deformation of the main frame 11 can be prevented. Since a function of the bottom cover 16 as a reinforcing member can be reduced, degree of freedom in selecting a material and a plate thickness of the bottom cover 16 can be increased. For example, the bottom cover 16 made of a resin material can be used for weight reduction and cost reduction.

<Support of Electrical Devices via Buffer Member>

The battery 20 and the controller 30 are supported in the closed cross section CS via a buffer member. Here, an example in which a damper made of a flat plate-shaped sponge member, a buffer rubber, or the like is used as the buffer member will be described. As shown in FIG. 6, a bottom damper 61 (first buffer member) is interposed between the bottom surface 23 of the battery 20, and each of the horizontal plate 411 of the first holding member 41 and the horizontal plate 431 of the second holding member 43. As shown in FIGS. 7 and 8, a lateral damper 62 (first buffer member) is interposed between the side surface 25 of the battery 20, and each of the vertical plate 412 of the first holding member 41 and the vertical plate 432 of the second holding member 43. Further, an upper damper 63 (second buffer member) is interposed between an upper surface 24 of the battery 20 and an inner wall surface of the main body portion 15 of the main frame 11.

As shown in FIGS. 7 and 9, a rear damper 64 (first buffer member) is interposed between the rear end flange 31 of the controller 30, and the pressing plate 446 and the support plate 451 that are disposed so as to sandwich the rear end flange 31. The rear damper 64 is a C-shaped damper that wraps around the rear end flange 31. A front damper 65 (first buffer member) is interposed between the front end flange 32 and the locking portion 461 of the third support member 46. The front damper 65 is also a C-shaped damper that wraps around the front end flange 32. Further, a flat plate-shaped upper damper 66 (second buffer member) is interposed between an upper surface 34 of the controller 30 and the inner wall surface of the main body portion 15 of the main frame 11.

Each of the dampers 61 to 66 has a function of absorbing vibration. Therefore, vibration transmitted from the body frame 1 to the battery 20 and the controller 30 can be absorbed by the dampers 61 to 66. Therefore, an impact or vibration is unlikely to be transmitted to the battery 20 and the controller 30.

[Structure for Leading Umbilical Member into Closed Cross Section]

In the balance bike BB, it is necessary to route an umbilical member such as the brake cable C1 or a control cable extending from the accelerator grip 52 (not shown) to the controller 30, from a front wheel 2 side toward a rear wheel 3 side. For example, the brake cable C1 is routed through the closed cross section CS of the main frame 11 from the brake lever 53 mounted on the handle 5 (FIG. 1) to the brake 304 of the rear wheel 3. Therefore, it is necessary to provide an opening in vicinity of the front of the main frame 11 to serve as a lead-in port that leads the brake cable C1 into the closed cross section CS. Such an opening may reduce waterproofness of the closed cross section CS. In view of this point, the present embodiment provides a structure that leads an umbilical member into the closed cross section CS with excellent waterproofness.

Figure 10A:
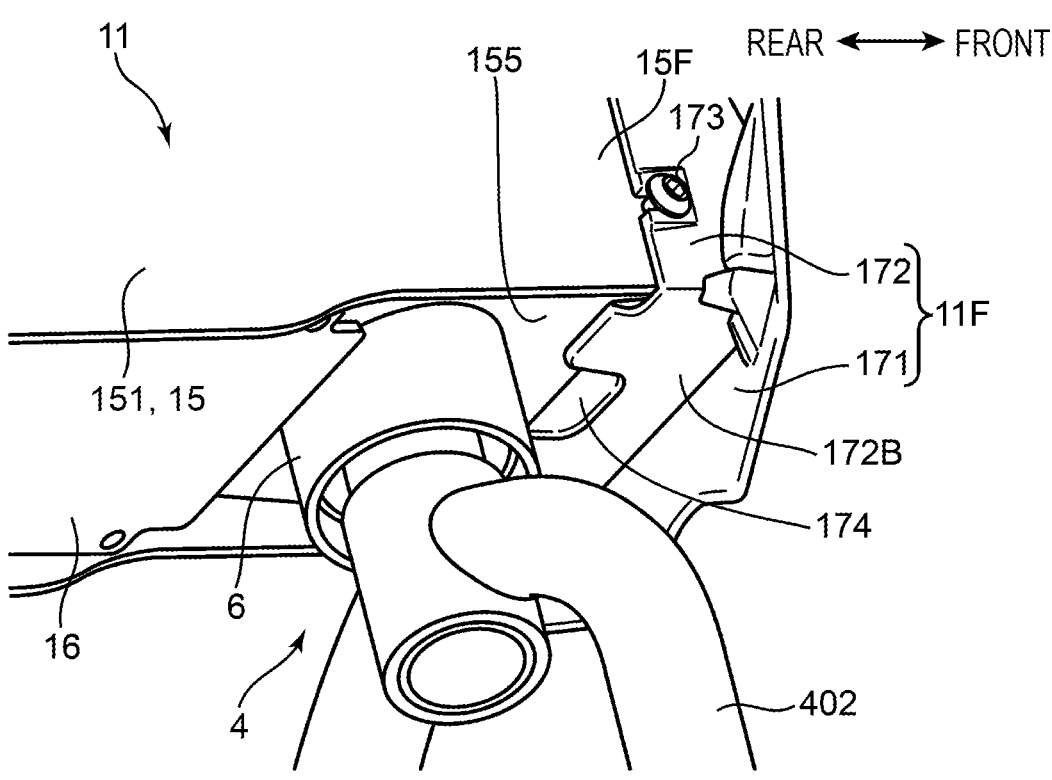
FIG. 10A is a perspective view showing a lead-in port disposed between the main frame and a front cover.

FIG. 10A is a perspective view of vicinity of a front end 15F of the main frame 11 (body frame 1) as viewed from below. A frame cover 11F is attached to the front end 15F. The frame cover 11F is disposed so as to cover the front end 15F, that is, so as to seal a front end opening of the main body portion 15 forming the closed cross section CS. That is, the lower surface opening 15H of the inverted U-shaped main body portion 15 is covered with the front bottom plate 155 and the bottom cover 16, and the front end opening of the main body portion 15 is covered with the frame cover 11F.

The frame cover 11F includes a front cover 171 and a housing portion 172. The front cover 171 is a flat plate having both an upper-lower width and a left-right width larger than those of the main body portion 15. The front cover 171 covers the front end opening of the main body portion 15. The front cover 171 may also be referred to as a number plate. The housing portion 172 is connected to a rear surface of the front cover 171 and has a size that allows the housing portion 172 to be fitted to the front end 15F of the main body portion 15. The housing portion 172 is fixed to the side plate 151 of the front end 15F by a fixing screw 173.

A bottom wall 172B of the housing portion 172 is provided with a lead-in port 174 for an umbilical member. The lead-in port 174 is formed by cutting out a part of the bottom wall 172B in a U-shape. A position of the lead-in port 174 in the front-rear direction is between the front cover 171 and the front end 15F of the main body portion 15. The lead-in port 174 has a size slightly larger than a diameter of the umbilical member led into the closed cross section CS, that is, a diameter of the brake cable C1 in the present embodiment.

Figure 10B:
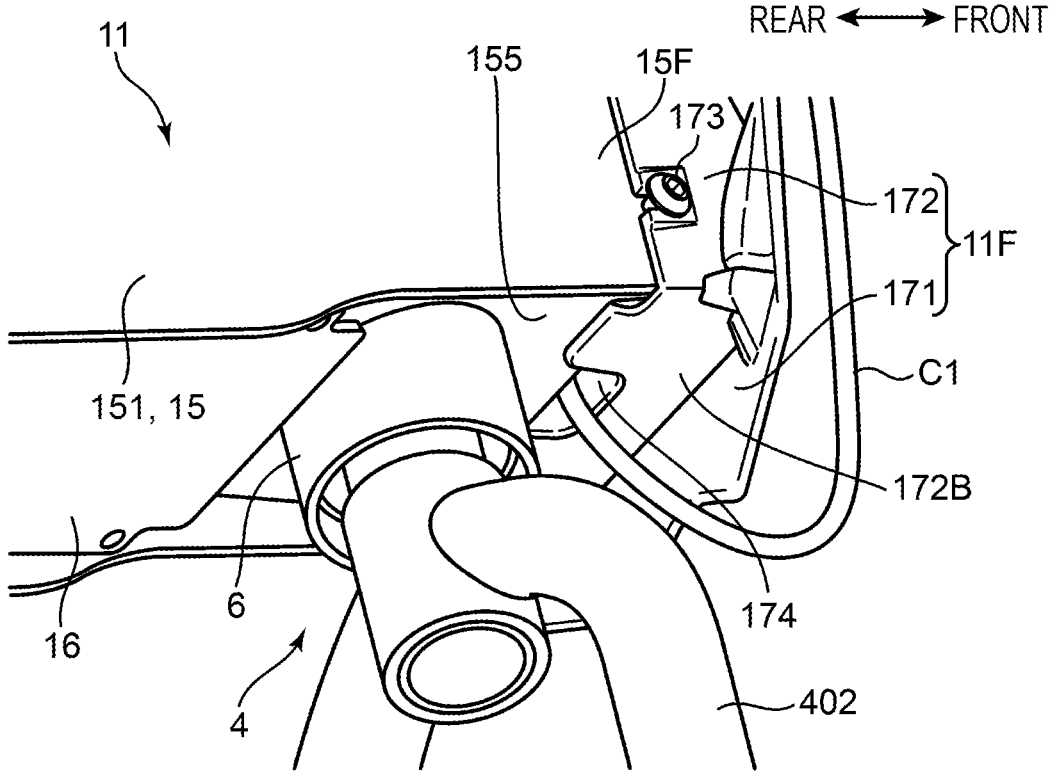
FIG. 10B is a perspective view showing a state in which a cable is led into the lead-in opening.

FIG. 10B is a perspective view showing a state in which the brake cable C1 is led into the lead-in port 174. The brake cable C1 is led downward from the brake lever 53, passes a lower end of the front cover 171, and is led into the closed cross section CS of the main frame 11 from the lead-in port 174.

According to such a lead-in structure for the umbilical member, the brake cable C1 and the like can be routed from the front wheel 2 side to the rear wheel 3 side using the closed cross section CS of the main frame 11. The lead-in port 174 is disposed between the front end 15F of the main body portion 15 and the front cover 171 having a size larger than that of the front end 15F. That is, the lead-in port 174 is formed at a position covered and hidden by the front cover 171. In addition, the opening is formed in the bottom wall 172B of the housing portion 172. Therefore, entry of moisture into the closed cross section CS from the lead-in port 174 can be prevented, and waterproofness for the electrical devices can be further improved.

[Operational Effects]

The balance bike BB according to the present disclosure described above has a structure in which the electrical devices including the battery 20 and the controller 30 are disposed in the closed cross section CS of the main frame 11 of the body frame 1 in a state of being separated upward from the inner bottom surface of the closed cross section CS. According to the balance bike BB, since the electrical devices are disposed in the closed cross section CS of the main frame 11, the electrical devices are prevented from directly coming into contact with rain water, splashed water, or the like.

In addition, the electrical devices are disposed in the closed cross section CS in the state of being separated upward from the inner bottom surface of the closed cross section CS, that is, the upper surface 16A of the bottom cover 16 in the above embodiment. That is, the electrical devices are disposed in a state of floating from the bottom cover 16 in the closed cross section CS. Even if moisture enters the main frame 11 or moisture due to condensation occurs in the closed cross section CS, the moisture drops onto the upper surface 16A of the bottom cover 16 due to gravity. This can prevent the moisture from originally coming into contact with the electrical devices. This can also prevent the moisture from staying on the bottom surface 23 and the side surface 25 of the battery 20, the bottom surface 33 of the controller 30, and the like. In particular, the bottom cover 16 of the main frame 11 is inclined downward toward the rear. For this reason, since the moisture actively moves rearward along the upper surface 16A of the bottom cover 16 due to an own weight thereof, the stay is less likely to occur. Therefore, it is possible to provide the balance bike BB in which the waterproofness for the electrical devices such as the battery 20 and the controller 30 is improved.

Further, since the battery 20 is accommodated in the main frame 11, even when the balance bike BB falls down or the like, the battery 20 is unlikely to directly collide with an object existing around the balance bike BB. Therefore, a protection effect for the battery 20 can be enhanced. Since the battery 20 is disposed between the front wheel 2 and the rear wheel 3, there is an advantage that a center of gravity of the vehicle can be easily disposed between the front wheel 2 and the rear wheel 3. In addition, since the electrical devices are disposed in an area rearward of the head tube 6 and forward of the seat tube 8, the tubes 6, 8 penetrating the main frame 11 can be prevented from interfering with the electrical devices.

In the above embodiment, since the battery 20 is disposed behind the controller 30, it is easier to dispose the battery 20, which is a heavy object, closer to a center between the front wheel 2 and the rear wheel 3 than the controller 30. Therefore, it is possible to bring the center of gravity of the vehicle close to a center of the balance bike BB in the front-rear direction, as compared with a case where the controller 30 is disposed behind the battery 20. On the other hand, the controller 30 is disposed at a position closer to the handle 5 than the battery 20. Therefore, it is possible to reduce a length of an electric cable that connects an operation element provided on the handle 5 and the controller 30.

[Modifications]

Although the embodiment of the balance bike BB according to the present disclosure has been described above, the present disclosure is not limited to the embodiment described above. For example, the balance bike BB described above can be modified as follows.

(1) The above embodiment shows an example in which the main frame 11 having the closed cross-sectional structure includes the main body portion 15 having the lower surface opening 15H for taking out the electrical devices and the bottom cover 16 that closes the lower surface opening 15H. Alternatively, a tubular body having no opening may be used as the main frame 11. In this case, the main frame 11 can be formed of, for example, half-split frame pieces. In addition, the opening provided in the main frame 11 may be provided in a side surface or a top surface of the main frame 11 instead of a lower surface of the main frame 11. The closed cross-sectional structure may be a substantially closed cross-sectional structure, and does not need to be the closed cross section CS that is completely sealed. For example, the main frame 11 may have an opening, such as an air hole, through which inner and outer spaces communicate with each other. Also in this case, the hole formed in the frame is preferably formed in a labyrinth structure that prevents entry of rainwater.

(2) The above embodiment shows an example in which the left and right end portions (stop plates 422) of the first support member 42 of the first support portion 40A and the left and right end portions (stop plates 442) of the second support member 44 of the second support portion 40B are respectively supported by the pair of side plates 151 of the main body portion 15 of the main frame 11. Alternatively, only one of the pair of side plates 151 may support the first support member 42 and the second support member 44.

(3) A metal member having rigidity may be used as the bottom cover 16, and the bottom cover 16 may be used as a support base for the first support member 42 and the second support member 44. In contrast, the pair of side plates 151 may be used as support bases even for the third support portion 40C according to the above embodiment, and all of the support portions 40A, 40B, 40C may be supported by the pair of side plates 151.

(4) The above embodiment shows an example in which the battery 20 and the controller 30 are supported via the dampers 61 to 66. The dampers 61 to 66 may be omitted. Alternatively, only the upper dampers 63, 66 interposed between the inner wall surface of the main body portion 15, and the battery 20 and the controller 30 may be omitted.

(5) The above embodiment shows an example in which the battery 20 and the controller 30 are disposed in the closed cross section CS of the main frame 11 as the electrical devices. For example, when the controller 30 is accommodated in a sufficiently watertight housing, the controller 30 may not be disposed in the closed cross section CS, and only the battery 20 may be disposed in the closed cross section CS. In contrast, only the controller 30 may be disposed in the closed cross section CS, and the battery 20 may be disposed at a position other than the closed cross section CS. In addition, electrical devices other than the battery 20 and the controller 30, for example, sensors such as a current sensor and a temperature sensor, and communication-related devices such as a wireless communication device and a GPS device may be disposed in the closed cross section CS.

When it is assumed that a plurality of electrical devices are disposed in the closed cross section CS, at least one electrical device may be separated upward from a bottom surface of the main frame 11. For example, only one of the battery 20 and the controller 30 may be disposed to be separated upward from the bottom surface of the main frame 11, that is, the upper surface 16A of the bottom cover 16. An arrangement of the battery 20 and the controller 30 in the front-rear direction is not particularly limited. In contrast to the above embodiment, the battery 20 may be disposed on a front side, and the controller 30 may be disposed on a rear side.

(6) A drain hole may be provided in the main frame 11 in order to actively drain water that has entered the closed cross section CS or water generated by condensation or the like. The drain hole can be provided by, for example, forming a hole in the rear bottom plate 154, or providing a slit between left and right side edges in vicinity of the lowermost portion of the bottom cover 16 and the pair of side plates 151. The water that has entered the closed cross section CS moves along the upper surface 16A of the bottom cover 16 that is inclined downward toward the rear, and is discharged from the drain hole.

(7) The above embodiment shows an example in which the motor 10 as the drive source is an in-hole motor. Instead of the in-hole motor, the drive source may be a motor provided at a position away from the wheel. In this case, a power transmission mechanism that transmits power of the motor to a driven wheel is provided. A chain, a belt, a drive shaft, or the like may be used as the power transmission mechanism.

(8) A charging connector that receives electric power supplied from an external power source may be connected to the battery 20. For example, a harness connected to the battery 20 and a charging connector provided at a distal end portion of the harness may be provided. In this case, a user can charge the battery 20 with electric power from the external power source via the charging connector without removing the battery 20 from the main frame 11. As described above, since the floating gap G is formed between the bottom cover 16 and the battery 20, the harness and the charging connector can be easily accommodated in the main frame 11. The harness and the charging connector may be accommodated in spaces between the battery 20 and the pair of side plates 151.

However, from a viewpoint of improving the waterproofness, it is preferable that a terminal portion and a harness connection portion provided in the battery 20 and the controller 30 including the harness and the charging connector are provided on upper portions of the battery 20 and the controller 30. Accordingly, contact of the terminal portion and the harness connection portion with rainwater can be further prevented.

Summary of Present Disclosure

The specific embodiments described above include the disclosure having the following configurations.

An electric balance bike according to the present disclosure includes: a front wheel and a rear wheel; an electric drive source configured to rotationally drive at least one of the front wheel and the rear wheel; a first frame configured to hold the front wheel and a second frame configured to hold the rear wheel; a main frame connecting the first frame and the second frame and having a closed cross-sectional structure; and an electrical device disposed in a closed cross section of the main frame in a state of being separated upward from an inner bottom surface of the closed cross section and configured to cause the drive source to generate power for the rotational drive.

According to this electric balance bike, since the electrical device is disposed in the closed cross section of the main frame, the electrical device does not directly contact rainwater, splashed water, or the like. In addition, the electrical device is disposed in the closed cross section in the state of being separated upward from the inner bottom surface of the closed cross section. That is, the electrical device is disposed in a state of floating from the bottom surface in the closed cross section. Even if moisture enters the main frame or moisture due to condensation occurs in the closed cross section, the moisture drops onto the inner bottom surface due to gravity. This can prevent the moisture from originally coming into contact with the electrical device, and can also prevent the moisture from staying on a bottom surface and a side surface of the electrical device. Therefore, according to the electric balance bike having the above aspect, waterproofness for the electrical device can be improved.

In the above-described electric balance bike, the electrical device may include a battery that supplies electric power to the drive source. In this case, waterproofness for the battery can be improved.

In the above-described electric balance bike, it is preferable that the main frame includes a main body portion having an opening for taking out the electrical device from the closed cross section, and a cover that closes the opening.

According to this electric balance bike, a user can easily perform maintenance, replacement, or the like on the electrical device through the opening of the main body portion.

15                                                                 16

Since the opening is closed by the cover, entry of rainwater from the opening can be prevented.

In the above-described electric balance bike, it is preferable that the opening is an opening that opens downward, the cover is a bottom cover that closes the opening, and the electrical device is supported by the main body portion in a state of being separated upward from the bottom cover.

According to this electric balance bike, the cover is disposed on a bottom surface side of the main body portion. That is, the cover is disposed at a position that is difficult for a viewer of the electric balance bike to see. Therefore, a design is not restricted by presence of the cover, and an aesthetic appearance of the main frame is easily improved.

In the above-described electric balance bike, it is preferable that the main body portion includes a pair of side plates facing each other with a predetermined interval therebetween, and the electric balance bike further includes a support member configured to support the electrical device and fixed to at least one of the pair of side plates.

According to this electric balance bike, the electrical device is supported in a laterally suspended state by the side plate of the main body portion. Therefore, a supporting state in which the electrical device floats from the bottom cover can be easily constructed. In addition, the bottom cover may be formed of a simple member on which the support member and the like are not mounted. Therefore, the user can easily attach the bottom cover to the opening and detach the bottom cover from the opening.

The above-described electric balance bike preferably further includes: a first buffer member interposed between the electrical device and the support member; and a second buffer member interposed between the electrical device and an inner wall surface of the main body portion.

According to this electric balance bike, vibration transmitted from the main frame to the electrical device can be absorbed by the first buffer member and the second buffer member. Therefore, the electrical device can be protected from vibration.

The above-described electric balance bike preferably further includes: an umbilical member routed from a front wheel side toward a rear wheel side; a front cover disposed so as to cover a front end side of the main frame; and a lead-in port formed between a front end surface of the main frame and the front cover and configured to lead the umbilical member into the closed cross section of the main frame.

According to this electric balance bike, the umbilical member can be routed from the front wheel side to the rear wheel side by using inside of the closed cross section of the main frame. In addition, the lead-in port for the umbilical member is formed between the front end surface of the main frame and the front cover. Therefore, the lead-in port can be formed at a position covered and hidden by the front cover, and entry of moisture into the closed cross section through the lead-in port can be prevented.

In the above-described electric balance bike, it is preferable that the electrical device includes the battery that supplies the electric power to the drive source and a controller that controls an operation of the drive source, and the controller is disposed in a state of being separated upward from the inner bottom surface together with the battery in the closed cross section of the main frame.

According to this electric balance bike, waterproofness for the battery and the controller can be improved.

What is claimed is:

1. An electric balance bike comprising:
a front wheel and a rear wheel;
an electric drive source configured to rotationally drive at least one of the front wheel and the rear wheel;
a first frame holding the front wheel and a second frame holding the rear wheel;
a main frame connecting the first frame and the second frame and having a closed cross section; and
an electrical device disposed to an inside of the closed cross section of the main frame in a state of being separated upward from an inner bottom surface of the closed cross section, the electrical device being configured to cause the drive source to generate power for which the drive source rotationally drives,
wherein the electrical device includes a battery configured to supply electric power to the drive source,
wherein the main frame includes a main body portion having an opening via which the electrical device is attachable to the inside of the closed cross section or detachable from the inside of the closed cross section, and a lower cover that closes the opening,
wherein the opening opens downward,
wherein the electrical device is supported by the main body portion in a state of being elevated above the lower cover, and
wherein the cover is disposed to be separated above and upward from a lower end of side plates of the main frame.

2. The electric balance bike according to claim 1, wherein
the main body portion includes a pair of side plates facing to one another with a predetermined interval, and
the electric balance bike further comprises a support member supporting the electrical device and fixed to at least one of the side plates.

3. The electric balance bike according to claim 2, further comprising:
a first buffer member interposed between the electrical device and the support member; and
a second buffer member interposed between the electrical device and an inner wall surface of the main body portion.

4. The electric balance bike according to claim 1, further comprising:
an umbilical member routed from a side on the front wheel toward a side of the rear wheel;
a front cover disposed to cover a front end side of the main frame; and
a lead-in port formed between a front end surface of the main frame and the front cover, and configured to lead the umbilical member into the closed cross section of the main frame.

5. The electric balance bike according to claim 1, wherein
the electrical device includes a controller configured to control an operation of the drive source, and
the controller is disposed in a state of being separated upward from the inner bottom surface together with the battery in the closed cross section of the main frame.

6. The electric balance bike according to claim 5, wherein
the battery has weight greater than weight of the controller, and
the battery is disposed behind the controller.

7. The electric balance bike according to claim 6, further comprising:

a handle on which an operation element is provided; and an electric cable that connects the operation element provided on the handle and the controller, wherein the controller is disposed at a position closer to the handle than the battery.

8. The electric balance bike according to claim 1, wherein the main body portion includes a pair of side plates facing to one another with a predetermined interval, and a support member extending in a left-right direction to bridge between the pair of side plates, and the electrical device is disposed, via the support member, to an inside of the closed cross section of the main frame in a state of being separated upward from an inner bottom surface of the closed cross section.

9. The electric balance bike according to claim 1, wherein the main frame is made of a metal material, and the cover is made of a resin material.

10. The electric balance bike according to claim 1, further comprising:

a seat, wherein a rear end of the battery is disposed behind a front end of the seat.

11. An electric balance bike comprising:

a front wheel and a rear wheel;

an electric drive source configured to rotationally drive at least one of the front wheel and the rear wheel;

a first frame holding the front wheel and a second frame holding the rear wheel;

a main frame connecting the first frame and the second frame and having a closed cross section; and an electrical device disposed to an inside of the closed cross section of the main frame in a state of being separated upward from an inner bottom surface of the closed cross section, the electrical device being configured to cause the drive source to generate power for which the drive source rotationally drives, wherein the electrical device includes a battery configured to supply electric power to the drive source, wherein the main frame includes a main body portion having an opening via which the electrical device is attachable to the inside of the closed cross section or detachable from the inside of the closed cross section, and a lower cover that closes the opening, wherein the opening opens downward, wherein the electrical device is supported by the main body portion in a state of being elevated above the lower cover, wherein the electrical device includes a controller configured to control an operation of the drive source, wherein the controller is disposed in a state of being separated upward from the inner bottom surface together with the battery in the closed cross section of the main frame, wherein the battery has weight greater than weight of the controller, and wherein the battery is disposed behind the controller.

12. An electric balance bike comprising:

a front wheel and a rear wheel;

an electric drive source configured to rotationally drive at least one of the front wheel and the rear wheel;

a first frame holding the front wheel and a second frame holding the rear wheel;

a main frame connecting the first frame and the second frame and having a closed cross section; and an electrical device disposed to an inside of the closed cross section of the main frame in a state of being separated upward from an inner bottom surface of the closed cross section, the electrical device being configured to cause the drive source to generate power for which the drive source rotationally drives, wherein the electrical device includes a battery configured to supply electric power to the drive source, wherein the main frame includes a main body portion having an opening via which the electrical device is attachable to the inside of the closed cross section or detachable from the inside of the closed cross section, and a lower cover that closes the opening, wherein the opening opens downward, wherein the electrical device is supported by the main body portion in a state of being elevated above the lower cover, wherein the lower cover includes brackets for attaching to the main body portion, and wherein the bracket is positioned below and spaced apart relative to the inner bottom surface of the battery supported by the main body portion.

* * * * *